Aug. 17, 1943. A. SHATKIN 2,327,138
JOINT CONSTRUCTION
Filed June 21, 1941
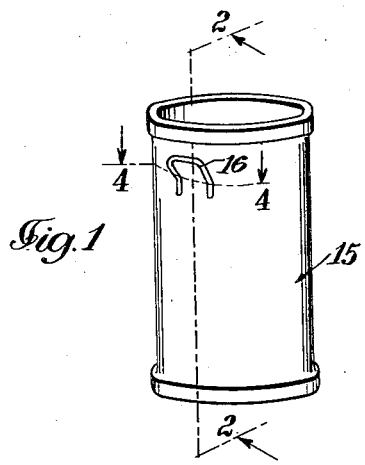
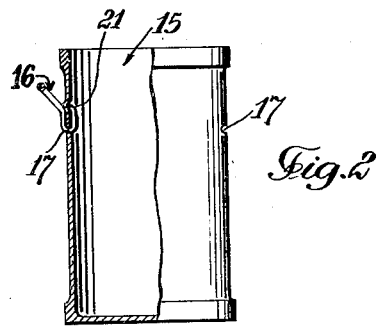
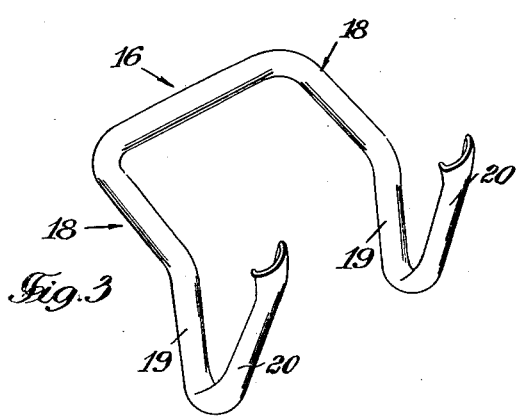
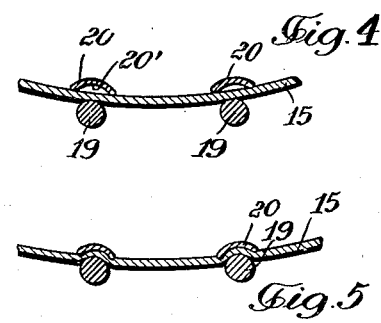
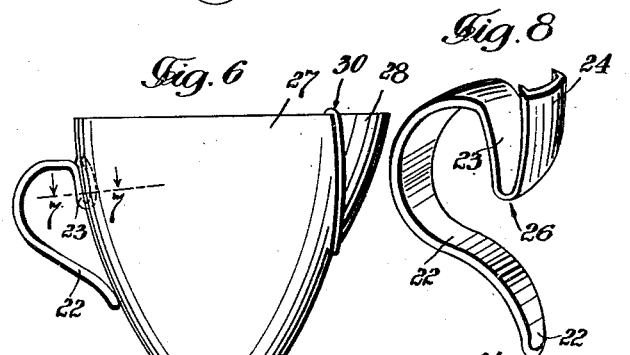
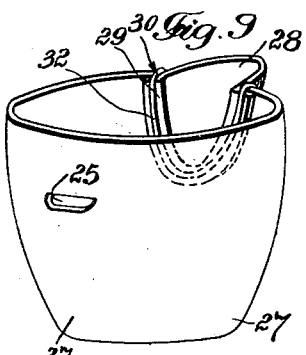
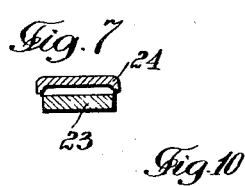
INVENTOR:
Aaron Shatkin
BY
ATTORNEY.

Patented Aug. 17, 1943

2,327,138

UNITED STATES PATENT OFFICE 2,327,138

JOINT CONSTRUCTION

Aaron Shatkin, Matawan, N. J.

Application June 21, 1941, Serial No. 399,217

3 Claims. (Cl. 16—125)

The present invention relates to joint constructions and more particularly to joint structures adapted for use to securely mount handles and other components.

The principal object of this invention is to provide a novel and improved joint construction, adapted for use to securely mount handles and other components to all kinds of hollow ware, flatware, receptacles and utensils.

Another object is to provide a novel and improved joint construction which is wholly mechanical in structure although presenting the appearance of a clean soldered joint, but in no manner utilizes solder. This feature is of advantage especially in the manufacture of silverware or other precious metalware articles, where soldering is both difficult and costly. Such appearance mentioned prevails only in small articles. When size is appreciable, the mechanical nature of the joint is apparent, as for instance it would be in ash can structures. However, the use of such joint construction for instance, in a miniature ash can of silver would appear as if soldered by a skilled artisan.

A further object of this invention, is to provide a joint construction of the character mentioned, which is simple in structure, cheap to produce, easy to effect, and efficient in producing a secure attachment.

Other objects and advantages will become manifest as this disclosure proceeds.

In the accompanying drawing forming part of this application, similar characters of reference indicate corresponding parts in all the views.

Fig. 1 is a perspective view of a receptacle in which its handles are joined thereto in accordance with the teachings of this invention.

Fig. 2 is a section taken along line 2—2 in Fig. 1.

Fig. 3 is an enlarged view of the handle which is mounted on the receptacle of Fig. 1, embodying the construction taught by the present invention.

Fig. 4 is a section taken at line 4—4 in Fig. 1, showing the handle components of Fig. 3, in their relation prior to "clinching."

Fig. 5 is a similar section showing the joint effected between the handle and the wall of the receptacle, after "clinching."

Fig. 6 is the side view of a cup or creamer, in which the handle and the spout elements are secured onto the body of the receptacle by joint constructions taught herein.

Fig. 7 is a section through the joint taken at line 7—7 in Fig. 6.

Fig. 8 is a perspective view of the cup's handle employed for effecting the joint structure of this invention.

Fig. 9 is a perspective view of the creamer or cup of Fig. 6, showing the manner in which the spout member is joined to the body of said creamer by a joint structure taught by this invention.

Fig. 10 shows a modified form of handle elements cross sections which may be used in the practice of this invention.

Fig. 11 shows the spout attaching member used to effect the joint structure disclosed by the present invention.

Fig. 12 is a section taken at line 12—12 in Fig. 11.

In the drawing, the numeral 15 designates a receptacle as for instance an ash can, which may be of any size and material which yields to bending. A handle therefor, indicated generally by the numeral 16, is mounted thereon through a pair of holes 17. This handle comprises a grip element 18, each end of which terminates in a V shaped element, the arms of the latter being numbered 19 and 20 respectively. The cross section of the free arms 20, is so shaped with respect to the cross section of the other arms 19, that one serves as a channel or socket to receive the other when said arms are bent one over onto the other, meaning the arms 19 and 20, considered in pairs. In the embodiment shown in Fig. 3, the arms 19 are of circular cross section, while the cross section of the arms 20, is such that they present a concave bottomed channel 20' to each of the arms 19. The free ends of the arms 20 are set through the holes 17 in the body of the receptacle 15, and the handle 16 is so positioned that the material of the body of the receptacle 15, shall lie between the arms 19 and 20, and at the vertex of the V formed between said arms. The arms 19 and 20, are bent or clinched towards each other so that the wall of the receptacle will become crimped and gripped in the resulting joint as is fully shown in the Fig. 4. The handle 16, is thus securely mounted onto the can 15, with a joint extremely strong. Of course, the V shaped element may have arms of any complementary shapes, for instance those shown in cross-section in Figs. 7 and 10.

It is desirable, especially in the manufacture of silverware articles, that the joint shall present a finished smooth construction, and appear as if the handle 16 is soldered onto the body of 15, which is preferably miniature and used as a cigarette, toothpick or match holder. It is therefore preferred that the extreme free end of the arm 20 shall be initially bent inwardly towards arm 19, as indicated at 21. It is apparent that when the arms 19 and 20 are clinched onto the wall of the receptacle 15 as described, that the inward end 21 will "bite" slightly into the material of 15, become imbedded therein, that is "hidden" and make a smooth job.

In the embodiment shown in Fig. 6, the handle 22, terminates in a substantially V-shaped element comprising the arms 23 and 24, which latter have complementary cross-sections as illustrated in Fig. 7. To mount this handle, have hole 25 of dimension to snugly receive the handle at the vertex of said V element 26, and then the arms 23 and 24 are brought together and thereby the clinched joint previously explained is likewise effected.

A cut-out in the front wall of the cup member 27 is provided to receive the spout 28, whose flange 29 is against the inside wall of the cup member. To secure said spout 28 onto the cup 27, I preferably use an endless member 30, the arms 31 of which are of complementary cross section with respect to the arms 32 thereof. This member 30 is fitted and shaped and of such size that its arms 31 shall lie along the front of the article 27, along the seam line of said cup and the spout member, while its arms 32 lie interior the cup and against the flange 29. The clinched joint is effected as previously by bringing the arms 31 and 32 together with the metal of the spout 28 and the wall of the creamer 27 between them, whereby the spout is securely mounted and joined and the arms 31 present an apparently "soldered" seamed joint.

This invention is capable of various forms and numerous applications without departing from the essential features herein disclosed. It is therefore intended and desired that the specific embodiments herein shall be deemed illustrative and not restrictive and that the patent shall cover all patentable novelty herein disclosed; reference being had to the following claims rather than to the particular description herein to indicate the scope of this invention.

I claim:

1. In combination, a handle having a V-shaped element extending therefrom; one arm of said element having a channel opposite the other arm, and a member of sheet material positioned between the arms of said element, said arms being adapted to be bent toward each other whereby the sheet material is bent into said channel arm and retained therein by the other arm of said element thereby securing said handle to the sheet material.

2. A combination as defined in claim 1, wherein the remote portion of the free end of one arm is bent toward the other arm of the V-shaped element, whereby upon bringing the arms towards each other, said free end of the bent arm is imbedded in the sheet material.

3. In combination, a handle having a V-shaped element extending therefrom; one arm of said element having a free end which is bent towards the other arm, and a member of sheet material positioned between the arms of said element, whereby upon bringing said arms towards each other, the free end of the bent arm is imbedded in the sheet material thereby securing the handle to the sheet material.

AARON SHATKIN.